United States Patent [19]
Anderson

[11] Patent Number: 5,509,758
[45] Date of Patent: Apr. 23, 1996

[54] METHOD AND APPARATUS FOR PADMOUNT TRANSFORMER INSTALLATION

[76] Inventor: Donald W. Anderson, 1857 Hayes Leonard Rd., Valparaiso, Ind. 46383

[21] Appl. No.: 137,462

[22] Filed: Oct. 18, 1993

[51] Int. Cl.$^6$ ............................................. F16L 1/00
[52] U.S. Cl. ........................... 405/154; 138/105; 248/49; 405/157
[58] Field of Search ..................... 405/157, 154, 405/156; 138/104, 105, 106, 107; 248/49

[56] References Cited

U.S. PATENT DOCUMENTS

| | | | |
|---|---|---|---|
| 1,744,102 | 1/1930 | Burke | 138/105 X |
| 2,906,294 | 9/1959 | Peterson | 138/105 X |
| 3,568,455 | 3/1971 | McLaughlin et al. | 138/105 X |
| 4,183,484 | 1/1980 | Mathews | 405/154 X |
| 4,504,171 | 3/1985 | Florence | 405/156 X |
| 5,192,165 | 3/1993 | Torielli | 405/156 |

*Primary Examiner*—Dennis L. Taylor
*Attorney, Agent, or Firm*—Ryan M. Fountain

[57] ABSTRACT

A template is provided having an expandable base portion (12) with a plurality of raised side cavities (24) to receive and retain underground cables prior to, during and after trench backfilling. The base includes a pair of slidably mounted wings (14) to assist in bridging the trench and stabilizing the base on ground adjacent the trench. A removable back member (28) is attached to the base to bridge the cavities and secure the cables therein. A guide (36) is provided for receiving a grounding rod (38) and a central opening (40) is formed in the base as a hand hold and to permit backfilling under the base when needed. In use, the base is mounted over the trench at the desired location for the padmount transformer. The cables are then secured to the base, and the trench is backfilled with the base being grounded. Afterwards, the cables are released from the base and attached to the padmount transformer.

7 Claims, 3 Drawing Sheets

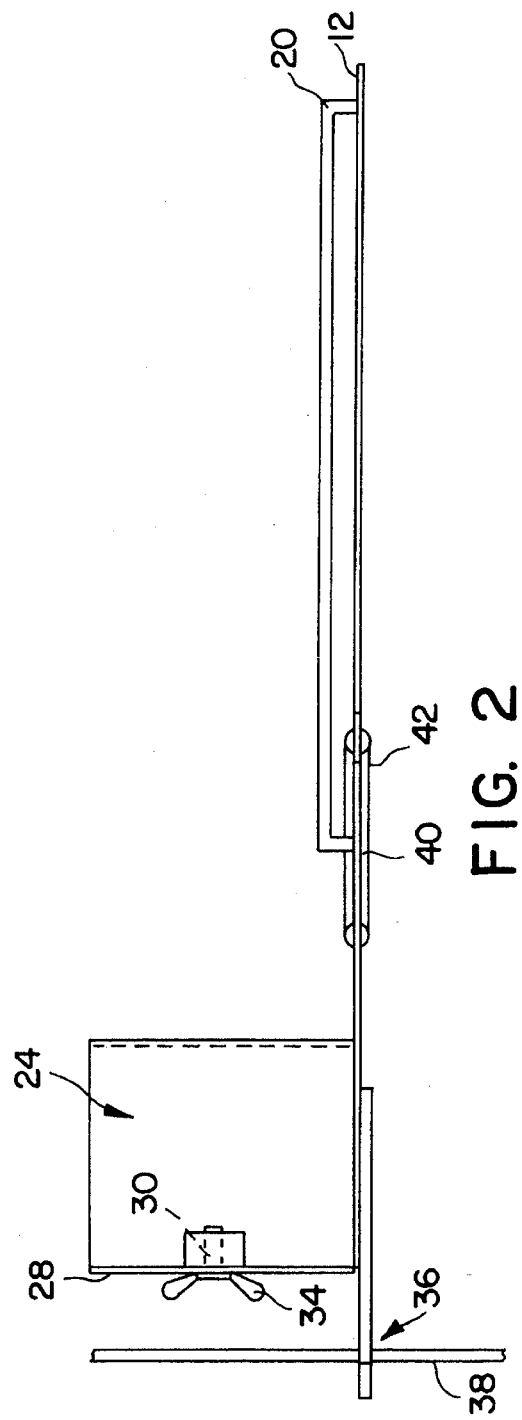
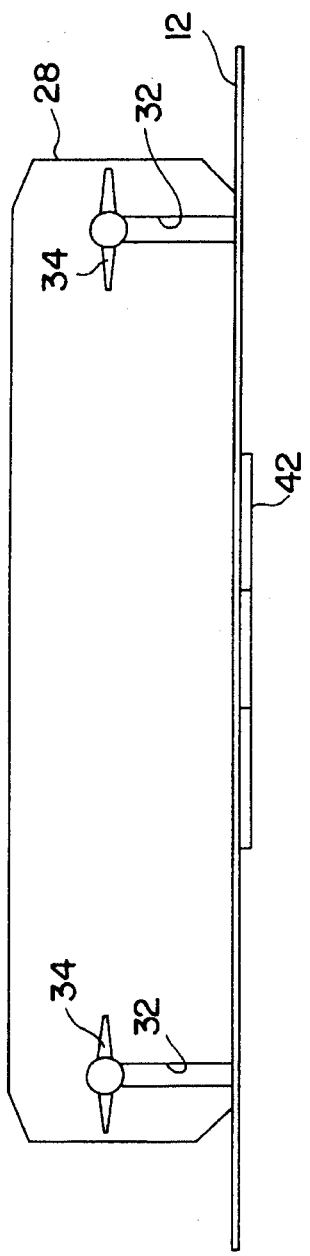

METHOD AND APPARATUS FOR PADMOUNT TRANSFORMER INSTALLATION

BACKGROUND AND SUMMARY OF THE INVENTION

The present invention relates generally to installation of underground cables and, more particularly, to methods and apparatus for installing underground electrical cables to a padmount transformer.

Previously, primary and secondary electrical cables have been buried by constructing a trench with a backhoe. These cables were preferably to be closely aligned with each other and the transformer bushings so that elbows and terminations could be installed as easily as possible. To ensure this correct placement, previous installations relied upon the presence of one or two people actually within the trench and holding the cables in place while the trench was being backfilled.

In addition to requiring more time and labor than desired, such methods have proven to be dangerous for those persons in the trench. As a result of the depth of the trench, the equipment used in backfilling and the environmental conditions of the job site, serious accidents were not uncommon from trench cave ins.

To overcome those disadvantages, the applicant has experimented with use of mechanical templates which hold and align the cables, instead of people, during the backfill process. However, in developing such devices it has become apparent that certain practical, and often conflicting, criterion exist. Ideally, the template must be large enough to span the trench width with sufficient clearance to remain stable during backfilling. However, the template should not be too heavy or bulky for a single person to lift, carry and place, or else the manpower savings is not sufficiently reduced. On the other hand, since backfilling operations can be delayed unexpectedly and job site environments are often muddy, the template must be sufficiently rugged to remain in place without deterioration. Further, its dimension should not preclude backfilling under the template itself. In addition, the cable attachment must be secure, but not too cumbersome to apply and remove. Naturally, the entire construction should ideally be inexpensive and easy to fabricate.

To achieve these and other objectives, the applicant has provided a template having an expandable base with a plurality of raised side cavities to receive and retain underground cables prior to, during and after trench backfilling. The base includes slidable wings to assist in bridging the trench and stabilizing the base on adjacent ground. A back member is removably attached to the base to bridge the cavities and secure the cables therein. A guide is provided for receiving a grounding rod, and a central opening is formed in the base as a hand hold and to permit backfilling under the base if needed. The entire assembly is preferably constructed from aluminum.

In use, the base is positioned over the trench at the desired location for the padmount transformer, and the wings are extended over the adjacent ground. The cables are preferably placed in conduit sleeves and then secured within the cavities. The base is securely grounded, and then the trench is backfilled. After backfilling is finished the back member is released from the base, and the base is separated from the cables. The cables, preferably still in the conduit sleeves, are then attached to the padmount transformer.

Other objects, advantages and novel features of the present invention will now become readily apparent to those skilled in the art upon consideration of the drawings and detailed description below.

BRIEF DESCRIPTION OF THE DRAWINGS

FIG. 2 shows a side view of the embodiment of FIG. 1 with wing members removed from attachment.

FIG. 3 shows a back view of the embodiment of FIG. 1.

DETAILED DESCRIPTION OF PREFERRED EMBODIMENTS

Figure 1:
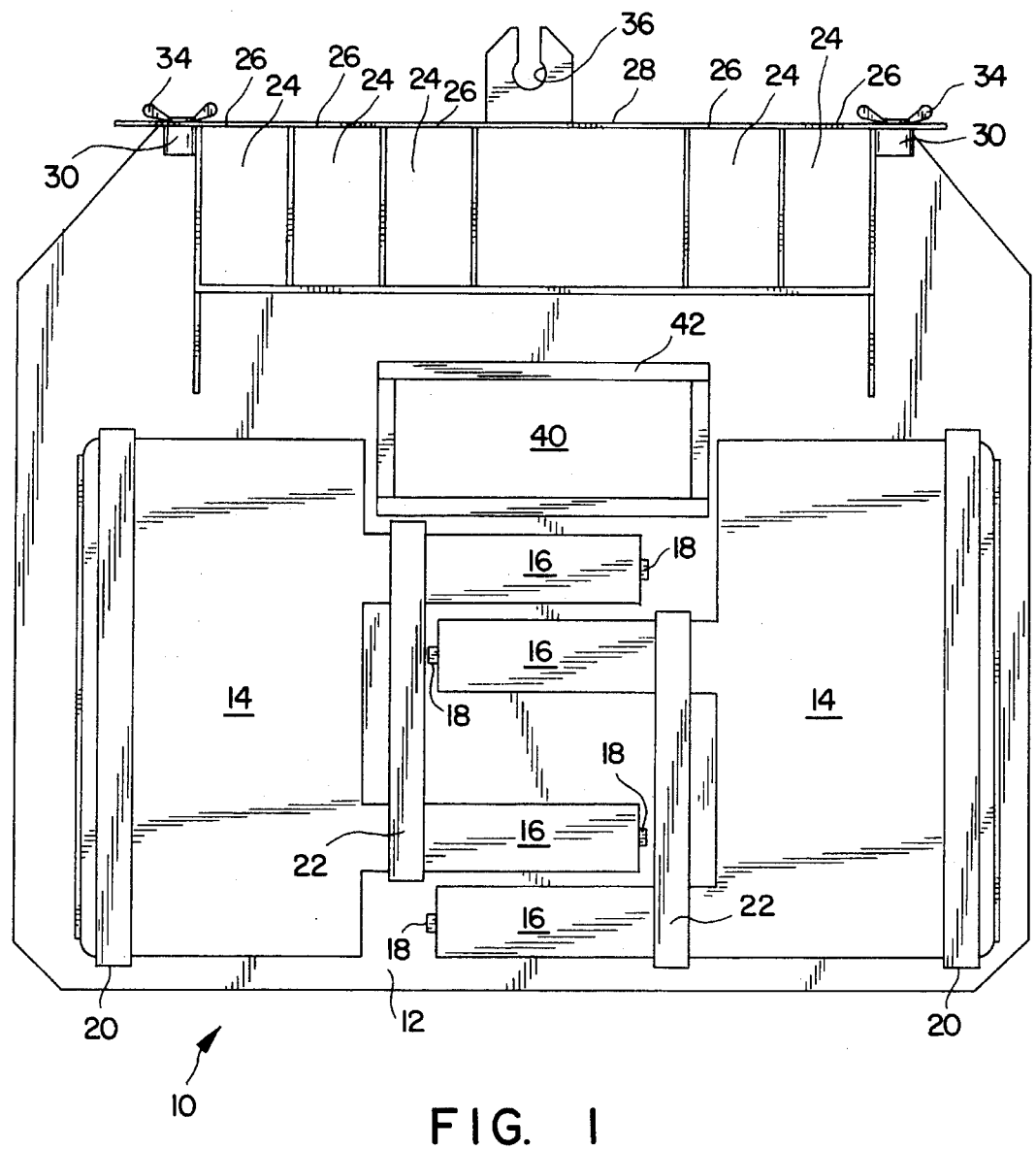
FIG. 1 shows a top plan view of a preferred embodiment of the present invention.
Figure 4:
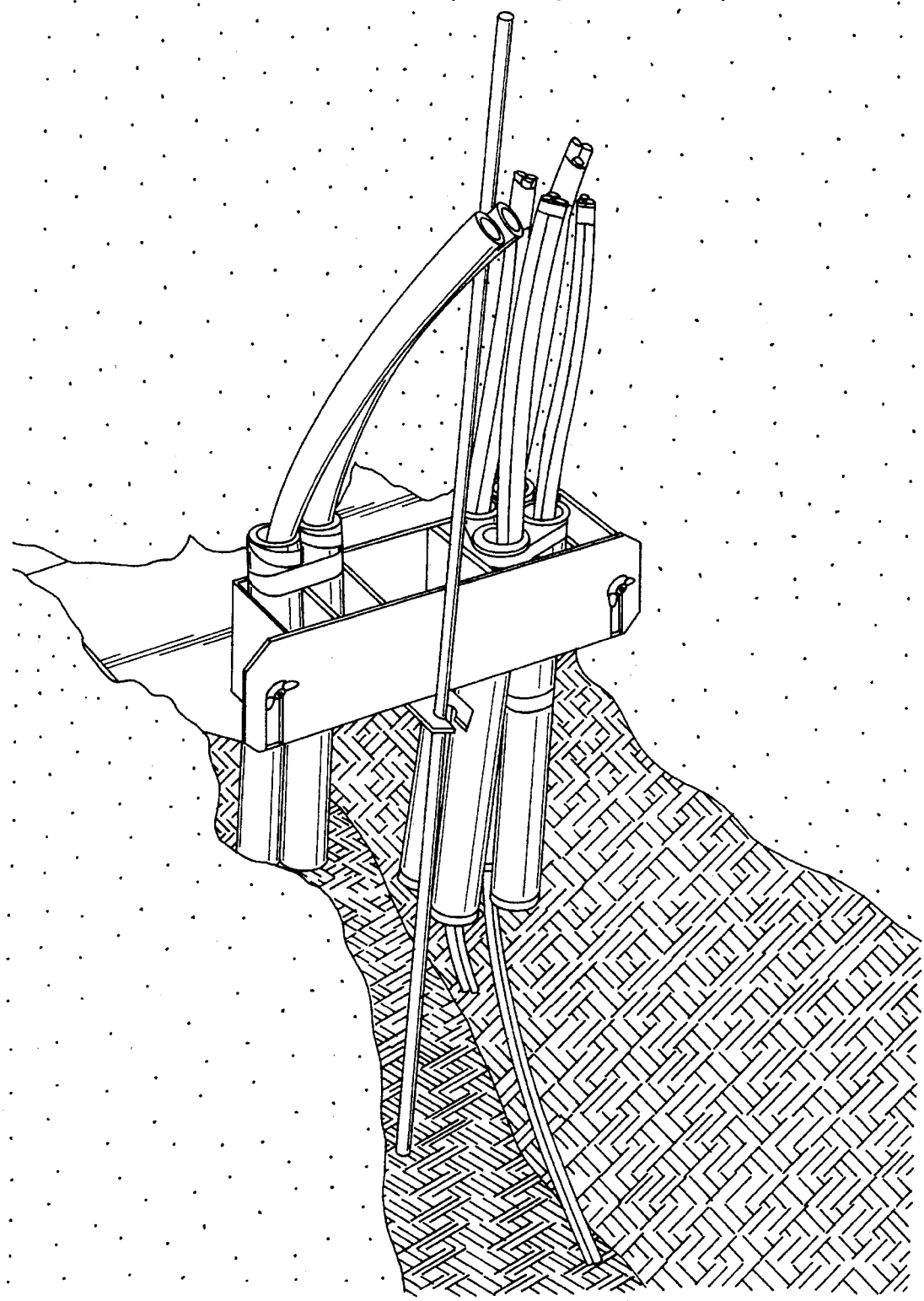

FIG. 1, which illustrates a preferred embodiment of the present invention, shows a template apparatus 10 having a base member 12 with left and right wing members 14 which are slidably connected thereto. These wing members each include a plurality of guide legs 16 each having stop blocks 18 at the free end thereof. Side straps 20 are attached to base member 12 and overlay wing members 14 with clearance to permit movement of wing members 14 between straps 20 and base member 12. Similarly, central straps 22 are attached to base member 12 and overlay each set of guide legs 16 extending from each wing member 14. These guide legs 16 are also movable under straps 22, except that blocks 18 prevent removal of guide legs 16 from straps 22 in one direction and the enlarged portion of wing members 14 prevent removal of guide legs 16 from straps 22 in an opposing direction.

Therefore, as shown wing members 14 provide selectably slidable extensions of base member 12 outwardly along the same plane as base member 12 when needed, but can be compacted inwardly for storage and ease of transport and placement.

Base member 12 is also provided with a plurality of raised compartments or cavities 24 for receiving and retaining cables. These cavities are dimensioned and disposed along base member 12 according to the number and placement of cables to be received by the padmount transformer to be installed. In the embodiment shown there are four vertical, rectangular cavities provided. Each cavity is open at its top and bottom and is open along a common side 26 to face outwardly from base member 12. Each cavity is, for example, dimensioned to receive either one primary cable, such as a 4/0 jacketed aluminum cable, or two secondary cables, such as 4/0 triplex aluminum cables.

Back member 28 is provided to secure and retain the cables within cavities 28 by simultaneously closing the openings of common side 26. Base member 12 is provided with threaded lugs 30 which extend outwardly along common side 26. Back member 28 includes slots 32 to receive lugs 30, and wing nuts 34 are, for example, provided to remain back member 28 onto lugs 30.

Base member 12 also includes guide slot 36 to receive grounding rod 38 (shown in FIG. 2 only) in a mechanical and electrical connection. Further, central opening 40 is provided in base member 12 which is large enough (4×8 inches, for example) to permit dirt to be filled in beneath base member 12 and to facilitate manual lifting and manipulation of base member 12 by persons using it. Preferably, base member 12 is formed from aluminum and opening 40 is lined with welded aluminum rod 42 to eliminate sharp edges.

In use, this template apparatus requires only a single person, and base member 12 is placed over the cable entrance excavation of the trench, preferably where the padmount transformer is desired. Wing members 14 are extended outwardly from base member 12 over adjacent ground beside the trench to expand the effective widths of base member 12 and provide additional support and stability. In preferred embodiments a two (2) foot length of 2-inch PVC conduit is placed over each end of each incoming cable. Afterwards, the conduit is temporarily taped into one of cavities 24.

When all of the cables are in cavities 24, back member 28 is mounted on lugs 30 and secured in place by wing nuts 34. Grounding rod 38 is secured into guide slot 36 and, for example, driven into the ground beneath base member 12. Thereafter, the trench is backfilled around and beneath base member 12, the cables being secured in place without the need for a person in the immediate vicinity of the trench.

When backfilling is complete, wing members 14 are slid back onto base member 12, back member 28 is removed from base member 12, and base member 12 is then separated from the conduits and grounding rod 38. Preferably, the conduits and grounding rod 38 stay in place when the padmount transformer is now connected to the cables. Thus, the template of this invention is reusable. Further, where a larger number of cables are involved, a plurality of these templates can be used at once, as in a back to back relation, for example.

Although the present invention has been described above in detail with respect to particular embodiments, the same is by way of illustration and example only, and not as a limitation. Those of skill in this art will now readily appreciate that various adaptions can be made within the spirit of this invention. Accordingly, the spirit and scope of the present invention are only limited by the scope of the claims below.

What is claimed is:

1. An apparatus for use in locating and positioning flexible cables subject to underground burial, comprising:
    a base member,
    grounding means electrically connected to said base member,
    retaining means for separately receiving a plurality of said cables and fixedly positioning said cables with respect to said base member, and
    at least one element slidably connected to said base member for expanding the effective width of said apparatus.

2. The apparatus according to claim 1 wherein said retaining means includes a plurality of cavities in said base member which are at least partially closed by a removable back element attached to one side of said base member.

3. The apparatus according to claim 2 wherein said base member includes a recess therethrough to permit filling beneath said apparatus.

4. A method of attaching underground cables to a padmount transformer installation wherein said cables are initially laid into an excavated trench, using an installation apparatus having a base member, a grounding rod securable to said base member, a plurality of receiving cavities in said base member, and at least one wing member slidably attached to said base member, comprising the steps of:
    first, sliding said wing member outwardly of said base member and positioning said installation apparatus over said trench at the location desired for said transformer installation,
    second, disposing said cables within said cavities and securing said grounding rod to said base member, and
    third, backfilling said trench around and beneath said installation apparatus,
    fourth, removing said installation apparatus from said cables, and
    fifth, attaching said transformer installation to said cables.

5. The method according to claim 4 wherein said cables are covered by a length of insulating conduit prior to the third step.

6. The method according to claim 5 wherein said cavities are aligned along one side of said base member with openings to receive said cables and a back member is provided to removably bridge those openings to secure said cables within said cavities.

7. An apparatus comprising:
    a base member,
    a plurality wing members slidably secured to said base member and movable along a common plane to extend outwardly from said base member,
    a grounding rod,
    means attached to said base member for mechanically and electrically securing said grounding rod to said base member,
    a plurality of raised cavities aligned and open along at least one side of said base member,
    a back member removably connectable to said base member for closing the opening of said cavities along at least one side of said base member, and
    an opening in said base member to permit access to areas beneath said base member.

* * * * *